(12) United States Patent
Kwok et al.

(10) Patent No.: US 12,694,414 B2
(45) Date of Patent: Jul. 28, 2026

(54) SYSTEMS AND METHODS FOR DETECTING MALICIOUS ACTIVITY

(71) Applicant: Capital One Services, LLC, McLean, VA (US)

(72) Inventors: Jennifer Kwok, Brooklyn, NY (US); Martin Figueroa-Ramirez, Silver Spring, MD (US); Susan Hogan, Alexandria, VA (US); Tara Ann Hickey, Herndon, VA (US)

(73) Assignee: Capital One Services, LLC, McLean, VA (US)

( * ) Notice: Subject to any disclaimer, the term of this patent is extended or adjusted under 35 U.S.C. 154(b) by 156 days.

(21) Appl. No.: 18/464,762

(22) Filed: Sep. 11, 2023

(65) Prior Publication Data

US 2025/0086658 A1     Mar. 13, 2025

(51) Int. Cl.
| | |
|---|---|
| G06Q 10/00 | (2026.01) |
| G06Q 20/34 | (2012.01) |
| G06Q 20/40 | (2012.01) |
| G06Q 30/018 | (2023.01) |

(52) U.S. Cl.
CPC ....... G06Q 30/0185 (2013.01); G06Q 20/354 (2013.01); G06Q 20/4016 (2013.01)

(58) Field of Classification Search
None
See application file for complete search history.

(56) References Cited

U.S. PATENT DOCUMENTS

| | | | |
|---|---|---|---|
| 10,701,086 B1 * | 6/2020 | Mushtaq | H04L 47/2483 |
| 2019/0034491 A1 * | 1/2019 | Griffith | G06F 16/258 |
| 2020/0314119 A1 * | 10/2020 | Karin | G06F 21/554 |

* cited by examiner

*Primary Examiner* — Tonya Joseph
(74) *Attorney, Agent, or Firm* — Foley & Lardner LLP

(57) ABSTRACT

Systems and methods for detecting abusive behavior. In some aspects, a method includes receiving first transfer data for a first transfer associated with a second category of resources and a first indication whether the first transfer is associated with abusive behavior. The first transfer data may be processed using a first machine learning model to generate a first prediction regarding whether the first transfer is associated with abusive behavior. In response to determining that the first prediction does not match the first indication, the first machine learning model may be updated to generate a second machine learning model for the second category of resources. The method may include receiving second transfer data for a second transfer associated with a second category of resources and processing the second transfer data using the second machine learning model to generate a second prediction regarding whether the second transfer is associated with abusive behavior.

20 Claims, 7 Drawing Sheets

600

400

COLLECTING BUYER DATA ASSOCIATED WITH A PURCHASE TRANSACTION OF A RETAIL ITEM — 410

ANALYZING THE BUYER DATA — 420

DETERMINING IF PURCHASE LIMIT IS EXCEEDED — 430

DETERMINING WHETHER BUYER IS PLANNING ON RESELLING THE RETAIL ITEM — 440

ACTIVATING SECURITY CONTROLS — 450

500

RECEIVE HISTORICAL BUYER DATA — 510

TRAIN A PROTECTION MODEL VIA THE HISTORICAL BUYER DATA — 520

DETERMINE A LIKELIHOOD THAT A BUYER WILL RESELL A RETAIL ITEM FROM A PURCHASE TRANSACTION — 530

COMPARE LIKELIHOOD TO A THRESHOLD — 540

GENERATE RECOMMENDED SECURITY ACTIONS — 550

600

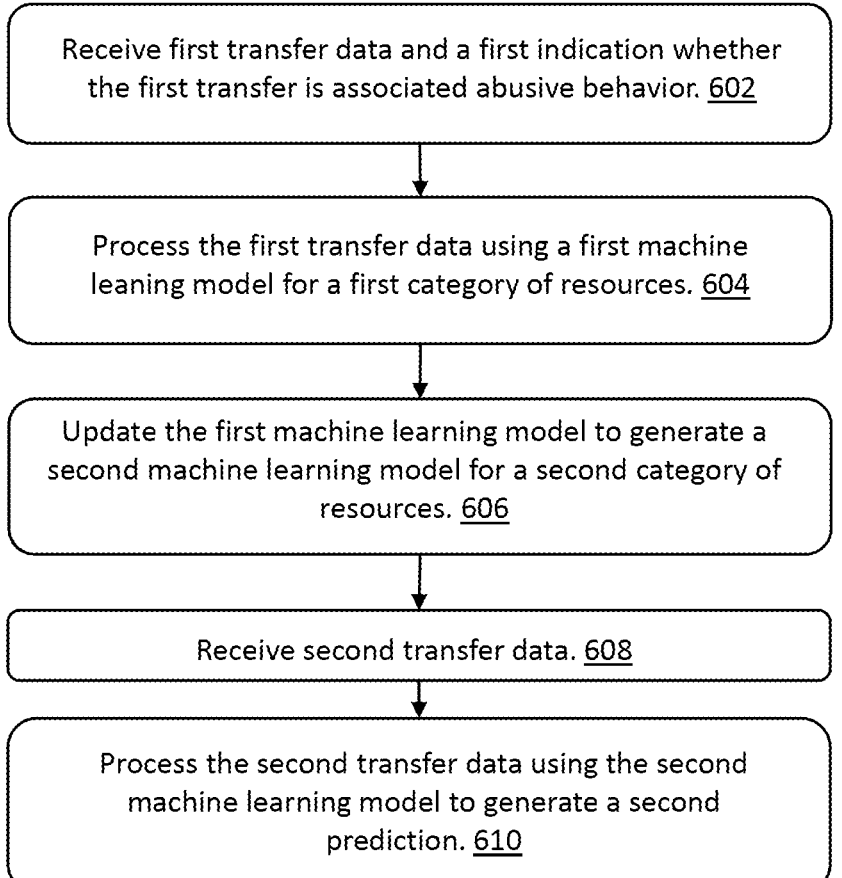

Receive first transfer data and a first indication whether the first transfer is associated abusive behavior. 602

Process the first transfer data using a first machine leaning model for a first category of resources. 604

Update the first machine learning model to generate a second machine learning model for a second category of resources. 606

Receive second transfer data. 608

Process the second transfer data using the second machine learning model to generate a second prediction. 610

FIG. 6

SYSTEMS AND METHODS FOR DETECTING MALICIOUS ACTIVITY

SUMMARY

Entities that distribute resources or provide services, such as in a computerized environment, are highly susceptible to malicious activity and abusive behavior. Malicious activity may include malicious access or abusive tampering with resources such as website content, sensitive content such as login credentials, and/or the like. For example, abusive behavior may include distributed denial of service (DDOS) attacks, where content on a website may be made unavailable for transmission to end consumers by using multiple computers to flood a single target with traffic to overload its servers. In other examples, abusers may inject malicious code into a database to access or manipulate sensitive information, e.g., by performing cross-site scripting (XSS) to steal sensitive data.

Complexity in schemes and anonymity of bad actors involved in abusive behavior makes abusive behavior difficult to detect. In particular, new and varied approaches of abusive behavior make it difficult to detect abusive behavior. For example, abusive behavior may manifest with different types of resources, or may exhibit new characteristics. It is often difficult to predict the types of resources that will be subject to potentially abusive behavior, and in what ways the abuse will manifest. Accordingly, among other things, a mechanism is desired where systems may draw on knowledge of known types of abusive behavior associated with a first category of resources to identify new types of abusive behavior associated with a second category of resources.

For example, DDOS attacks may be identified by detecting unusual spikes or specific patterns at a network. A first machine learning model for identifying abuse for DDOS may be used to generate new models for detecting new types of abusive behavior for a different category of resources. For example, if behavior for accessing other computer resources (e.g., graphics processing units (GPUs)) exhibits properties typically associated with DDOS attacks, the disclosed methods may be used herein to generate a new machine learning model for identifying abusive behavior for GPUs based on preexisting machine learning models for identifying DDOS attacks. The newly generated model may then be used to identify, for example, never before seen types of abusive behavior.

In some aspects, disclosed embodiments relate to a method for detecting malicious activity in resource transfers. The method may include receiving first transfer data for a first transfer associated with a second category of resources and a first indication whether the first transfer is associated with abusive behavior with respect to an entity involved in the first transfer. The first transfer data may be processed using a first machine learning model to generate a first prediction regarding whether the first transfer is associated with abusive behavior with respect to an entity involved in the first transfer. In response to determining that the first prediction does not match the first indication (e.g., by determining that an output probability of the first machine learning model exceeds a threshold probability), the first machine learning model may be updated, based on the first transfer data and the first indication, to generate a second machine learning model for the second category of resources to predict whether a transfer is associated with abusive behavior with respect to an entity involved in the transfer. The method may further include receiving second transfer data for a second transfer associated with a second category of resources and processing the second transfer data using the second machine learning model to generate a second prediction regarding whether the second transfer is associated with abusive behavior with respect to an entity involved in the second transfer.

In some examples, the method further includes receiving a training dataset comprising (1) transfer data for a plurality of transfers of a first category of resources and (2) corresponding indications regarding whether a transfer is associated with abusive behavior with respect to an entity involved in the transfer. Based on the training dataset, the first machine learning model for the first category of resources may be trained to predict whether a transfer is associated with abusive behavior with respect to an entity involved in the transfer.

In some examples, the method further includes, in response to the second prediction indicating that the second transfer is associated with abusive behavior, transmitting a command to prevent authentication of the second transfer. For example, transmitting the command for preventing authentication of the second transfer may include disabling virtual authentication data associated with the first transfer.

In some examples, the method further includes, in response to receiving an indication of a successful execution of the command, transmitting a notification at a device of the entity indicating prevention of authentication of the second transfer. The method may also include receiving, via a user interface, a user input indicating authorization for authentication of the second transfer, and in response to receiving the user input, transmitting a second command for enabling authentication of the second transfer. Based on the user input, the second machine learning model may be updated. In some examples, the method includes extracting, from second transfer data, properties of the second transfer, wherein the properties include resource data and virtual authentication data associated with the second transfer data.

Various other aspects, features, and advantages of the invention will be apparent through the detailed description of the invention and the drawings attached hereto. It is also to be understood that both the foregoing general description and the following detailed description are examples and are not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety of (i.e., the entire portion), a given item (e.g., data) unless the context clearly dictates otherwise.

BRIEF DESCRIPTION OF THE DRAWINGS

FIG. 6 illustrates a method for detecting malicious activity, in accordance with one or more embodiments described herein.

DETAILED DESCRIPTION

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other cases, well-known structures and devices are shown in block diagram form in order to avoid unnecessarily obscuring the embodiments of the invention.

As described herein, malicious activity on computer systems is a growing concern and can cause significant harm to entities (e.g., individuals such as end consumers, companies, etc.). These attacks can range from stealing personal information, disrupting normal operations, and manipulating or destroying data. One of the biggest dangers of malicious attacks is the anonymity and technical sophistication of the attackers, making it difficult to identify and detect the abuse. Additionally, attacks may use multiple techniques in complex schemes, making it challenging for system to detect malicious activity in real-time.

As malicious activity is difficult to detect and quickly evolving, a mechanism is desired where systems may draw on knowledge of known types of abusive behavior associated with a first category of resources to identify new types of abusive behavior associated with a second category of resources.

Another example of abusive behavior is abusive redistribution (e.g., reselling), where third parties purchase resources with the intention of reselling them at inflated prices, which often takes place during emergencies, natural disasters, or in times of high demand, when consumers are most vulnerable. Although entities attempt to prevent abuse by placing limits on a maximum amount of a resource a reseller can obtain, abusers often get around such limits by utilizing multiple different accounts to make purchases. Furthermore, it is difficult to detect abusive reselling behavior because it is difficult to predict the types of products that will be subject to potentially abusive behavior, and in what ways the abuse will manifest. For example, the pandemic led to abusive reselling behavior associated with a category of resources such as personal protective and hygiene supplies, e.g., toilet paper and sanitizer. However, it was difficult to predict abuse for such products or know how abusive behavior would manifest for personal protective and hygiene supplies, as it may differ from patterns of abusive reselling that were prevalent in the past (e.g., event tickets, in-demand consumer electronics, etc.).

Figure 1:
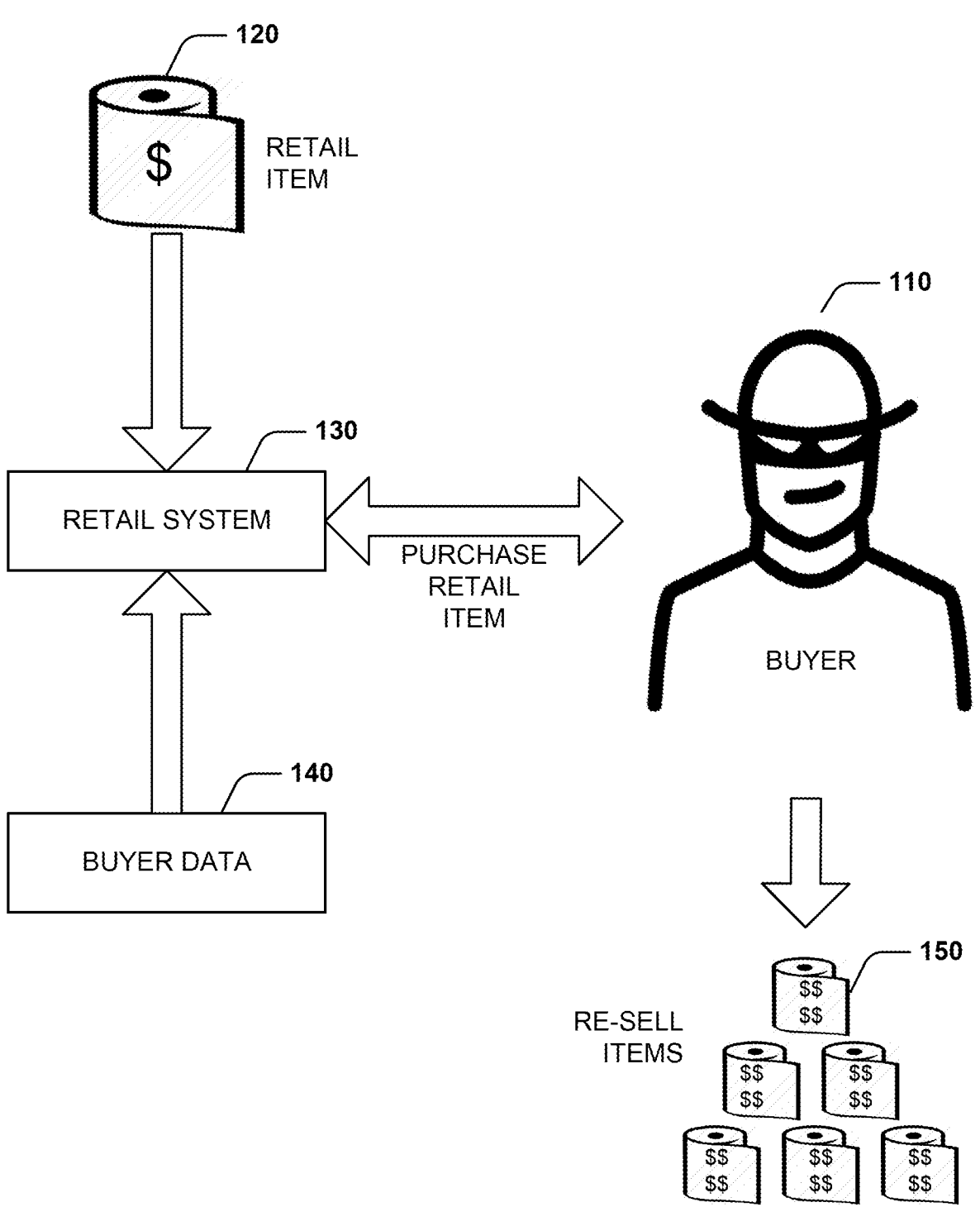
FIG. 1 illustrates a high-level overview of an example implementation, in accordance with one or more embodiments described herein.

FIG. 1 illustrates a high-level overview of an example implementation. A buyer 110 can purchase or initiate a purchase transaction of a retail item 120 via a retail system 130 (a.k.a. point of sale system) from a merchant. The retail system 130 can be a website, portal, application, browser extension, and/or the like. The retail system 130 can be associated with a merchant that offers the retail item 120 for sale. In some embodiments, the retail system 130 is interfaced with a retailer or retail website that offers the retail item 120 for sale over the Internet or network. The retail system 130 can provide a portal through which buyers or the buyer 110 can shop for one or more of retail item 120 and complete purchases of the retail item 120 for shipping to the buyer 110 or an address associated with the buyer 110. The buyer 110 can complete a purchase of the retail item 120 through the retail system 130.

The retail system 130 can collect buyer data 140 that is associated with the purchase transaction for the retail item 120. The retail system 130 can collect at least one of a transaction history, an IP address, a related website history, a merchant history, shipping data, a price history, a sale history, and/or the like. For example, the retail system 130 can record every purchase of the retail item 120 that is made from an IP address. The retail system 130 can associate the IP address to a buyer 110 or account of the buyer 110. In one instance, the buyer data can include virtual payment card data, including a virtual card number or other payment information.

The retail system 130 can determine if the buyer 110 is exceeding the purchase limit for the retail item 120. In some embodiments, the retail system 130 can determine the purchase limit from the buyer data 140. In other embodiments, the retail system 130 can determine if the buyer 110 exceeds the limit based on the buyer data 140. In some embodiments, the retail system 130 can match purchases of the retail item 120 to an IP address of the buyer 110. The retail system 130 can sum all purchases of the retail item 120 matched to the IP address within a time period. The retail system 130 can compare the sum of purchases to the purchase limit and determine the buyer 110 exceeded the purchase limit if the sum of purchases from the same IP address exceeds the purchase limit. For example, the buyer 110 can use the same device but different accounts with the same merchant to attempt to exceed the purchase limit of the retail system 130 by purchasing the limit on each account. The retail system 130 can determine excess of the purchase limit by summing the purchases of the different accounts that come from the same IP address and comparing the sum to the purchase limit.

In some embodiments, the retail system 130 can analyze the buyer data 140. The retail system 130 can analyze the buyer data 140 to determine whether the buyer 110 is planning to resell the retail item 120. The retail system 130 can analyze subsequent actions of the buyer 110, correspondence of the buyer 110, transactions of the buyer 110, accounts of the buyer 110, related website data, and/or the like. For example, the retail system 130 monitors the buyer 110 accessing a sales posting of the retail item 120 that is generated from the same IP address that is associated with the buyer 110. The retail system 130 can determine that the buyer 110 intends to resell the retail item 120.

In one instance, a machine learning model can be trained to identify a potentially abusive or fraudulent reseller based on buyer data 140, among other things. The machine learning model can be trained with historical data, such as label data for abusive or non-abusive behavior. The machine learning model can thus infer or predict abusive behavior that might otherwise not be detected. For example, the machine learning model can be a classifier that seeks to classify a buyer as an abusive reseller or a non-abusive reseller. Further, the same or a different machine learning model, or protection model, can recommend a particular course of action to address an abusive reseller, such as activation or implementation of one or more security actions.

The retail system 130 can activate or implement security actions. The retail system 130 can activate security actions based on the determination that the buyer 110 has exceeded the purchase limit and/or intends to resell the retail item 120. The retail system 130 can implement security actions like notifying the merchant if the buyer exceeds the purchase limit or is likely to resell the retail item 120. In some embodiments, the retail system 130 can block the purchase transaction from being executed at a financial institution. In other embodiments, the retail system 130 can block the purchase transaction from executing with the merchant. The retail system 130 can block the resale of the retail item 120 at a financial institution, secondary merchant or website, and/or the like. In some embodiments, the retail system 130 can change the price of the resale of the retail item 120 to an original sale price.

In some embodiments, the buyer 110 can repackage quantities of the retail item 120 and offer to resell items 150 at a marked-up unit price in an attempt to subvert the retail system 130. The retail system 130 can calculate unit prices of the resell items 150 to compare to an original unit price of the retail item 120 to determine if the resell items 150 are being sold at an abusive price. The retail system 130, upon detecting a unit price above the original unit price or above an upper gap from the original unit price (e.g., Manufactures Suggested Retail Price (MSRP)), can block the sale of the resell items 150 as a security action. In other embodiments, the retail system 130 can implement the original unit price to the resell items 150.

Figure 2:
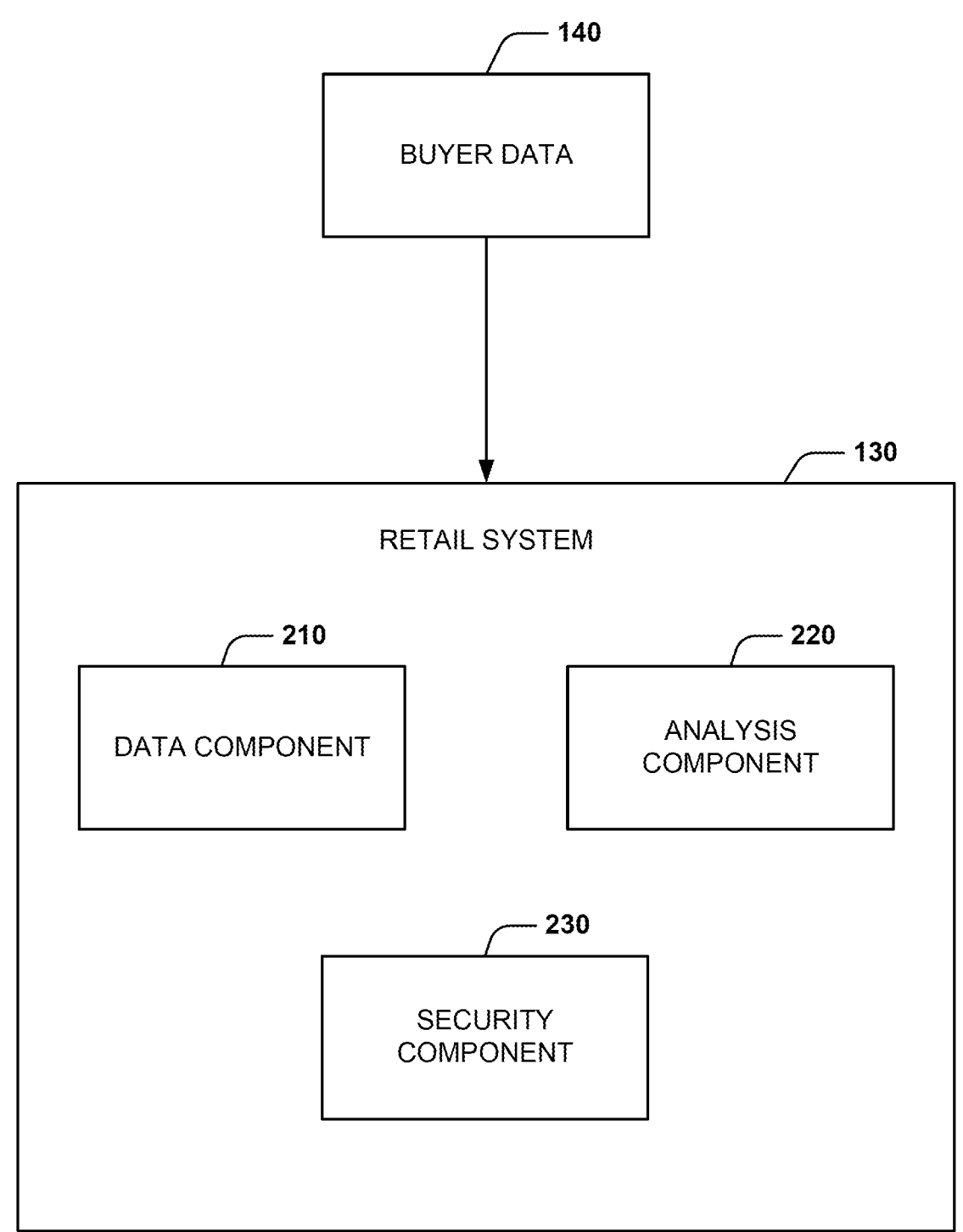
FIG. 2 illustrates an example component diagram of a retail system, in accordance with one or more embodiments described herein.

FIG. 2 illustrates a detailed component diagram of the retail system 130. The retail system 130 can include a data component 210, an analysis component 220, and a security component 230. The components can be executed by a processor, hardware, software, a combination thereof, and/or the like. The data component 210 can collect buyer data 140 that is associated with the purchase transaction for the retail item 120. The data component 210 can collect at least one of a transaction history, an IP address, a related website history, a merchant history, shipping data, a price history, a sale history, and/or the like from the buyer data 140. In some embodiments, the data component 210 can access a financial institution or a server associated with a financial institution to retrieve buyer data 140, such as account information, transaction history, deposits, merchant history, and/or the like. For example, the data component 210 can record subsequent deposits to a financial account of the buyer 110 made by a related merchant (e.g., a competitor of the merchant) to match a resale of the retail item 120.

The retail system 130 can include an analysis component 220. The analysis component 220 can determine if the buyer 110 is exceeding a purchase limit for the retail item 120. In some embodiments, the analysis component 220 can determine the purchase limit from the buyer data 140. In other embodiments, the analysis component 220 can determine if the buyer 110 exceeds the limit based on the buyer data 140. In some embodiments, the analysis component 220 can match purchases of the retail item 120 to an IP address of the buyer 110. The analysis component 220 can sum all purchases of the retail item 120 matched to the IP address within a time period. For example, the same IP address has ordered 40 units of the retail item 120 over 4 separate transactions within the same week. The analysis component 220 can compare the sum of purchases to the purchase limit and determine the buyer 110 exceeded the purchase limit if the sum of purchases from the same IP address exceeds the purchase limit. For example, the buyer 110 can use the same device but different accounts with the same merchant to attempt to exceed the purchase limit of the retail system 130 by purchasing the limit on each account. The analysis component 220 can determine excess of the purchase limit by summing the purchases of the different accounts that come from the same IP address and comparing the sum to the purchase limit.

In some embodiments, the analysis component 220 can analyze the buyer data 140. The analysis component 220 can analyze the buyer data 140 to determine whether the buyer 110 is planning to resell the retail item 120. The analysis component 220 can analyze subsequent actions of the buyer 110, correspondence of the buyer 110, transactions of the buyer 110, accounts of the buyer 110, related website data, and/or the like. For example, the analysis component 220 monitor the buyer 110 accessing a sales posting of the retail item 120 that is generated from the same IP address that is associated with the buyer 110. The analysis component 220 can determine that the buyer 110 intends to resell the retail item 120.

In some embodiments, the analysis component 220 can determine if the buyer 110 plans to resell the retail item 120 for a profit based on a machine learning model of the buyer data 140. The analysis component 220 can train a protection model based on the buyer data 140. The analysis component 220 can train the protection model according to the machine learning technique and the buyer data 140 as a training data set. The analysis component 220 can invoke the protection model to determine a likelihood that the buyer will resell the retail item.

The security component 230 can activate and/or implement security actions. The security component 230 can activate security actions based on the determination that the buyer 110 has exceeded the purchase limit and/or intends to resell the retail item 120. The security component 230 can implement security actions like notifying the merchant if the buyer exceeds the purchase limit or is likely to resell the retail item 120. In some embodiments, the security component 230 can block the purchase transaction from executing at a financial institution. In other embodiments, the security component 230 can block the purchase transaction from executing with the merchant. The security component 230 can block the resale of the retail item 120 at a financial institution, secondary merchant or website, and/or the like. In some embodiments, the security component 230 can change the price of the resale of the retail item 120 to an original sale price.

Figure 3:
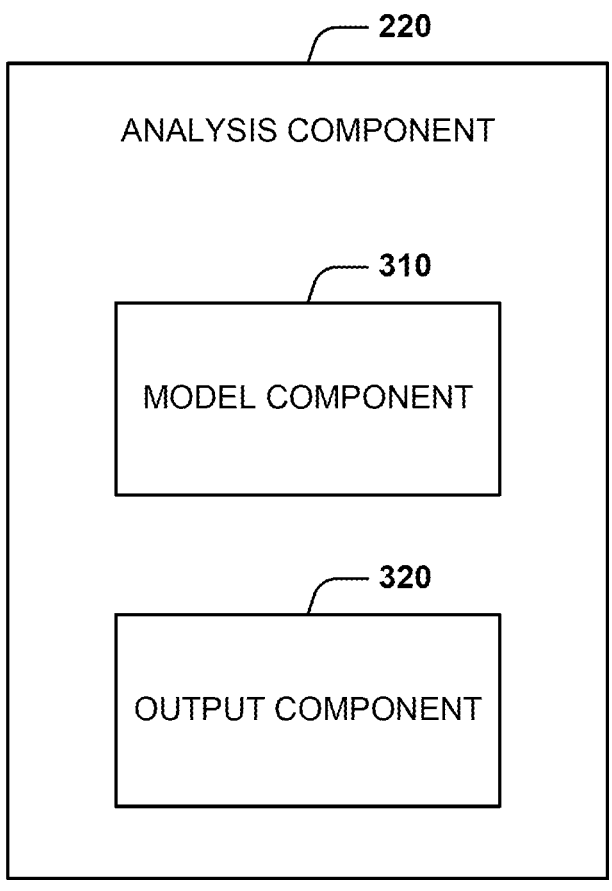
FIG. 3 illustrates an example component diagram of an analysis component, in accordance with one or more embodiments described herein.

FIG. 3 illustrates a detailed component diagram of the analysis component 220. The analysis component 220 can include a model component 310. The model component 310 can train a protection model that can predict the intent of buyer 110 to resell the retail item 120. The model component 310 can train the protection model via historical buyer data (e.g., buyer data 140) as a training dataset. An output component 320 can invoke the protection model to determine a likelihood that the buyer 110 will resell the retail item 120.

The model component 310 can train the protection model via historical interactions of the buyer 110 via the machine learning technique. The model component 310 can utilize a machine learning technique to determine trends between historical interactions of the buyer 110 or other buyers that have resold items purchased from the merchant. The model component 310 learns from existing data to make predictions about the purchases the buyer 110 may make with the retail system 130. The model component 310 builds the protection model from historical data (e.g., "training data set") in order to make data-driven predictions or decisions expressed as outputs or assessments of the buyer 110. The model component 310 can determine the trends and/or correlations within the historical buyer data (e.g., buyer data 140). For example, the protection model can factor in a rate of purchases of the retail item 120 by an IP address or account, subsequent sales of the retail item 120, number of accounts associated with one IP address, and/or the like. In some embodiments, the model component 310 utilizes the machine learning technique to analyze the historical interactions across different users or financial institutions and/or the like to determine a protection model based on correlations in the history from the financial institution.

The output component 320 can invoke or apply the protection model to present factors (e.g., current buyer data) to determine a recommendation or likelihood of resale based on the trends revealed by the machine learning and the historical buyer data (e.g., buyer data 140). In some embodiments, the output component 320 via the protection model can determine an output as a recommendation for or against security actions. In other embodiments, the output component 320 can suggest a tier of security actions to be implemented based on the level of likelihood of resale. For example, a likelihood above 80%, the output component 320 can recommend an account lock of the buyer 110 while a likelihood between 50% and 80%, the output component 320 can recommend a warning to be sent to the buyer 110 and/or merchant.

Figure 4:
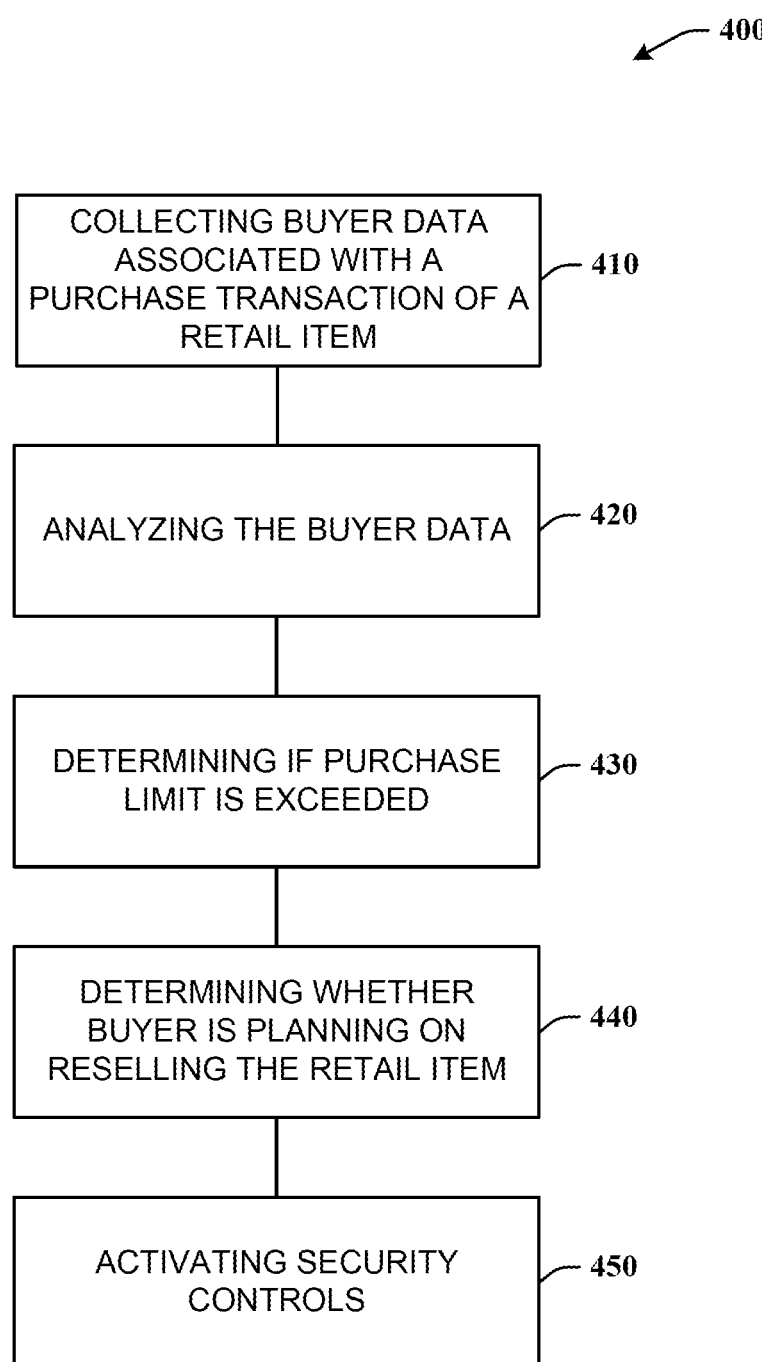
FIG. 4 illustrates a method for identifying abusive resellers, in accordance with one or more embodiments described herein.
Figure 5:
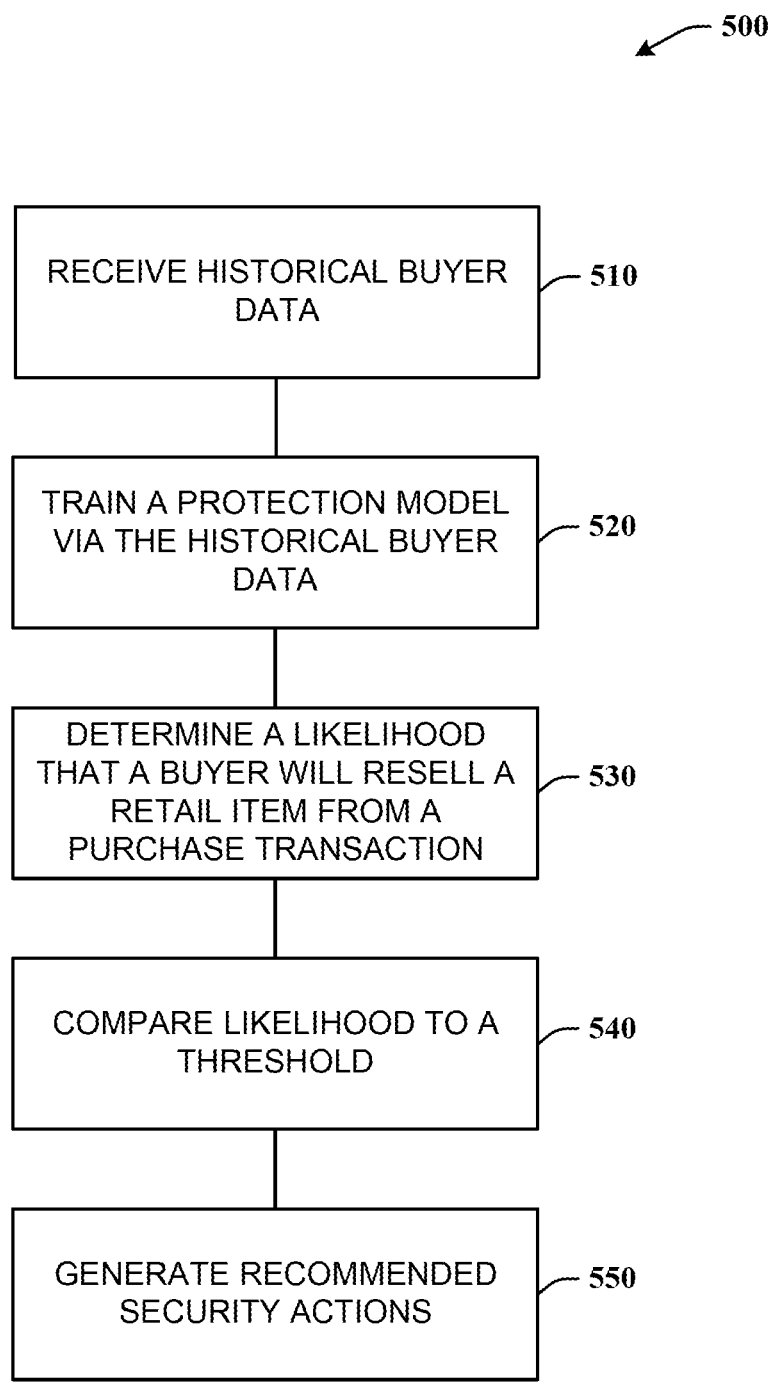
FIG. 5 illustrates a method for identifying abusive resellers, in accordance with one or more embodiments described herein.

With reference to FIGS. 4 and 5, example methods 400 and 500 are depicted for identifying abusive resellers. While, for purposes of simplicity of explanation, the one or more methodologies shown herein, e.g., in the form of a flow chart, are shown and described as a series of acts, it is to be understood and appreciated that the subject disclosure is not limited by the order of acts, as some acts may, in accordance with the disclosure, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the disclosure. It is also appreciated that the methods 400 and 500 are described in conjunction with a specific example is for explanation purposes.

FIG. 4 illustrates a method 400 for identifying abusive resellers that can be implemented by the retail system 130.

For example, method 400, as described herein, may be used to enable individuals or entities to detect abusive behavior for new categories of resources by generating a new model for detecting abusive behavior for the new category of product by updating a base model configured to detect abusive behavior for a first (e.g., known) category of product. For example, the method may include receiving data regarding a first transfer associated with a second (e.g., new) category of resources and an indication as to whether the first transfer is associated with abusive behavior. Using the data, a first machine learning model may be updated to generate a second machine learning model for the second category of resources to predict whether other transfers are associated with abusive behavior.

At 410, the method 400 can collect buyer data that is associated with a purchase transaction of a retail item. The retail system 130 can collect buyer data 140 such as transaction history, an IP address, a related website history, subsequent buyer actions, a merchant history, shipping data, a price history, a sale history, and/or the like. At 420, the method 400 can analyze the buyer data. The retail system 130 can analyze the buyer data 140 to make determinations about the buyer 110.

According to some examples, the method may include receiving second transfer data, e.g., after the first transfer data, for a second transfer associated with a second category of resources. The entity may be a producer and/or manufacturer of the goods. In some examples, the entity may be a primary distributor of the goods. In some examples, the entity may be an end consumer, or may be an abusive reseller.

The method may further include determining, based on properties of the record, that the record corresponds to a second category of resources, wherein the second category of resources is distinct from a first category of resources. For example, based on an amount purchased, or the type of good purchased, it may be determined that the behavior for a type of product being transferred is different than typical behavior for transferring the type of product.

At 430, the method 400 can determine if a purchase limit is exceeded. The retail system 130 can aggregate purchase quantities from different accounts originating from the same IP address to determine if the purchase limit has been exceeded via deceptive means or tactics.

At 440, a planned resale (or likelihood of resale) of the retail item can be determined. The retail system 130 can analyze the buyer data 140 for actions indicative of a resale. For example, correspondence, other merchant sites, and/or the like. The retail system 130 can utilize a protection model to determine the likelihood that the buyer 110 will resell the retail item 120 for a higher price (e.g., price gouging or abusive resale price).

According to some examples, a probability that the transfer corresponds to abusive behavior may be determined by processing the second transfer data using the second machine learning model to generate a second prediction regarding whether the second transfer is associated with abusive behavior with respect to an entity involved in the second transfer. For example, the record of the transfer may be input into a first machine learning model for a first category of resources to obtain a probability that the transfer corresponds to abusive behavior.

The first machine learning model may be trained using a training set comprising transfer data of a first category of resources. For example, a system may receive a training dataset comprising (1) transfer data for a plurality of transfers of a first category of resources and (2) corresponding indications regarding whether a transfer is associated with abusive behavior with respect to an entity involved in the transfer. For example, the corresponding indications may be label data indicating whether each transfer of the one or more transfers corresponds to abusive behavior. The system may then train, based on the training dataset, the first machine learning model for the first category of resources, e.g., to predict whether a transfer is associated with abusive behavior with respect to an entity involved in the transfer.

As described herein, the method may include receiving first transfer data for a first transfer associated with a second category of resources and a first indication whether the first transfer is associated with abusive behavior with respect to an entity involved in the first transfer. The first transfer data may be processed using a first machine learning model to generate a first prediction regarding whether the first transfer is associated with abusive behavior with respect to an entity involved in the first transfer.

In response to determining that the first prediction does not match the first indication (e.g., determining that an output probability of the first machine learning model exceeds a threshold probability), the method may further include updating the first machine learning model, based on the first transfer data and the first indication, to generate a second machine learning model for the second category of resources to predict whether a transfer is associated with abusive behavior with respect to an entity involved in the transfer.

According to some examples, the method may further include extracting, from the record, the properties of the record, wherein the properties include (1) resource data, (2) second entity identification data, and (3) virtual authentication data of the record. In some examples, the properties (e.g., that are extracted) further include an internet protocol address. These properties may be used in generating the second machine learning model and/or as inputs to the first machine learning model.

At 450, the method 400 can activate one or more security actions. The retail system 130 can activate security actions if the buyer 110 has exceeded the purchase limit and/or the likelihood of resale of the retail item exceeds a threshold likelihood. The security actions can be account locking, blocking the purchase transaction, blocking shipping of the retail item 120, account suspension, generating an alert to the buyer 110 and/or merchant, forced pricing of the resale price to a price that is equal to an original sale price, and/or the like.

According to some examples, the security actions may be activated in response to determining that the likelihood and/or probability exceed a threshold likelihood or probability. For example, the method may include comparing the probability to a threshold probability and in response to determining that the threshold probability is exceeded, transmitting a command for preventing authentication of future resource exchange between the first entity and second entity. For example, in response to the second prediction indicating that the second transfer is associated with abusive behavior, the method may include transmitting a command to prevent authentication of the second transfer.

In some examples, the method further includes transmitting a notification at a device of the entity indicating prevention of authentication of the second transfer, e.g., in response to receiving an indication of a successful execution of the command. In this way, a user at the entity (e.g., manufacturer, primary distributer, etc.) may be notified when a resource is potentially being transferred is a potential abusive reseller.

In some examples, a transfer, while detected to be associated with abusive behavior, may not actually constitute abusive behavior. A user (e.g., at the entity) may indicate when this is the case. For example, the method may further include receiving, via a user interface, a user input indicating authorization for authentication of the second transfer and in response to receiving the user input, transmitting a second command for enabling authentication of the second transfer. The first and/or second machine learning model may be updated based on a user input. For example, if user input indicates that a transfer is associated or is not associated with abusive behavior, the machine learning models may be updated (e.g., refined). The method may further include extracting, from the second transfer data, properties of the second transfer, wherein the properties include resource data and virtual authentication data associated with the second transfer data.

FIG. 5 illustrates another method 500 for identifying abusive resellers that can be implemented by the retail system 130. At 510, the method can receive historical buyer data. The retail system 130 can receive historical buyer data from a financial institution and/or a merchant at which the buyer 110 has an account. The historical buyer data can be previous purchase transactions and/or confirm resales by the buyer 110. At 520, a protection model can be trained with historical buyer data. The retail system 130 can train the protection model with data that captures trends and/or correlations in the historical buyer data.

At 530, the method 500 determines a likelihood, or probability, that a buyer will resell the retail item. The retail system 130 can invoke the protection model to output a likelihood of a resale of the retail item 120 by the buyer 110. At 540, the likelihood can be compared to a threshold likelihood or a tier of likelihood. The retail system 130 can compare the likelihood to the threshold or tiers. For example, the retail system 130 can determine the likelihood of resale is 70% as compared to a 60% to 80% threshold tier. At 550, the method 500 can determine recommended security actions. The retail system 130 can determine one or more security actions based on the likelihood of exceeding the threshold. In some embodiments, a buyer 110 that is matched to a tier can be affected differently such that different levels of security actions can be recommended by the retail system 130 based on the tier.

FIG. 6 illustrates a method for detecting malicious activity, in accordance with one or more embodiments described herein. For example, the system may use process 600 (e.g., as implemented on one or more system components described above) in order to generate a new machine learning model to detect new types of malicious activity based on known and/or different malicious activity in the past.

At step 602, process 600 (e.g., using one or more components described above) includes receiving first transfer data and a first indication as to whether the first transfer is associated with abusive behavior. For example, the system may receive first transfer data (e.g., purchase or transaction data) for a first transfer associated with a second category of resources and a first indication whether the first transfer is associated with abusive behavior with respect to an entity involved in the first transfer. For example, the transfer may be a purchase by a reseller from a primary manufacturer of home goods and may include details such as cost, number of purchased goods, etc.

At step 604, process 600 (e.g., using one or more components described above) includes processing the first transfer data using a first machine leaning model for a first category of resources to generate a first prediction. For example, the system may process the first transfer data using a first machine learning model for a first category of resources to generate a first prediction regarding whether the first transfer is associated with abusive behavior with respect to an entity involved in the first transfer. For example, the system may input data regarding the transfer into a first machine learning model which may be trained to predict abusive behavior in a different type of good, e.g., computer products. Because there may be similarities in the patterns of abusive behavior (e.g., number of units bought within a certain time frame, cost of the product, IP address, etc.), the first machine learning model may be used on transfers of other categories of resources as well.

In some embodiments, the system may train the first machine learning model for the first category of resources, e.g., using transfer data for transfers of the first category of resources. For example, the system may receive a training dataset comprising (1) transfer data for a plurality of transfers of a first category of resources and (2) corresponding indications (e.g., labels) regarding whether a transfer is associated with abusive behavior with respect to an entity involved in the transfer. The system may train, based on the training dataset, the first machine learning model for the first category of resources to predict whether a transfer is associated with abusive behavior with respect to an entity involved in the transfer.

At step 606, process 600 (e.g., using one or more components described above), includes, in response to determining that the first prediction does not match the first indication, updating the first machine learning model to generate a second machine learning model for a second category of resources. For example, the system may, in response to determining that the first prediction does not match the first indication, update the first machine learning model, based on the first transfer data and the first indication, to generate a second machine learning model for the second category of resources to predict whether a transfer is associated with abusive behavior with respect to an entity involved in the transfer. The system may determine that the base model (e.g., the first machine learning model) gave the wrong prediction and may determine that a new model specific to the second category is needed.

At step 608, process 600 (e.g., using one or more components described above) includes receiving second transfer data. For example, the system may receive second transfer data for a second transfer associated with a second category of resources.

At step 610, process 600 (e.g., using one or more components described above) includes processing the second transfer data using the second machine learning model to generate a second prediction. For example, the system may process the second transfer data using the second machine learning model to generate a second prediction regarding whether the second transfer is associated with abusive behavior with respect to an entity involved in the second transfer.

In some embodiments, the process includes, in response to the second prediction indicating that the second transfer is associated with abusive behavior, transmitting a command to prevent authentication of the second transfer. For example, transmitting the command for preventing authentication of the second transfer comprises disabling virtual authentication data (e.g., virtual card numbers, etc.) associated with the first transfer. In some examples, in response to receiving an indication of a successful execution of the command, the system may transmit a notification at a device of the entity indicating prevention of authentication of the second transfer.

In some examples, the virtual authentication data may have been wrongly disabled, e.g., in the case that there was no malicious activity, or a user may indicate, prior to determining whether or not there was malicious activity, that the second transfer is authorized. The system may receive, via a user interface, a user input indicating authorization for authentication of the second transfer and in response to receiving the user input, transmit a second command for enabling authentication of the second transfer. The system may update, based on the user input, the second machine learning model.

In some examples, the system may further extract, from the second transfer data, properties of the second transfer, wherein the properties include resource data and virtual authentication data associated with the second transfer data.

It is contemplated that the steps or descriptions of FIG. 6 may be used with any other embodiment of this disclosure. In addition, the steps and descriptions described in relation to FIG. 6 may be done in alternative orders or in parallel to further the purposes of this disclosure. For example, each of these steps may be performed in any order, in parallel, or simultaneously to reduce lag or increase the speed of the system or method. Furthermore, it should be noted that any of the components, devices, or equipment discussed in relation to the figures above could be used to perform one or more of the steps in FIG. 6.

As used herein, the terms "component" and "system," as well as various forms thereof (e.g., components, systems, sub-systems) are intended to refer to a computer-related entity, either hardware, a combination of hardware and software, software, or software in execution. For example, a component may be but is not limited to being a process running on a processor, a processor, an object, an instance, an executable, a thread of execution, a program, and/or a computer. By way of illustration, both an application running on a computer and the computer can be a component. One or more components may reside within a process and/or thread of execution, and a component may be localized on one computer and/or distributed between two or more computers.

Figure 7:
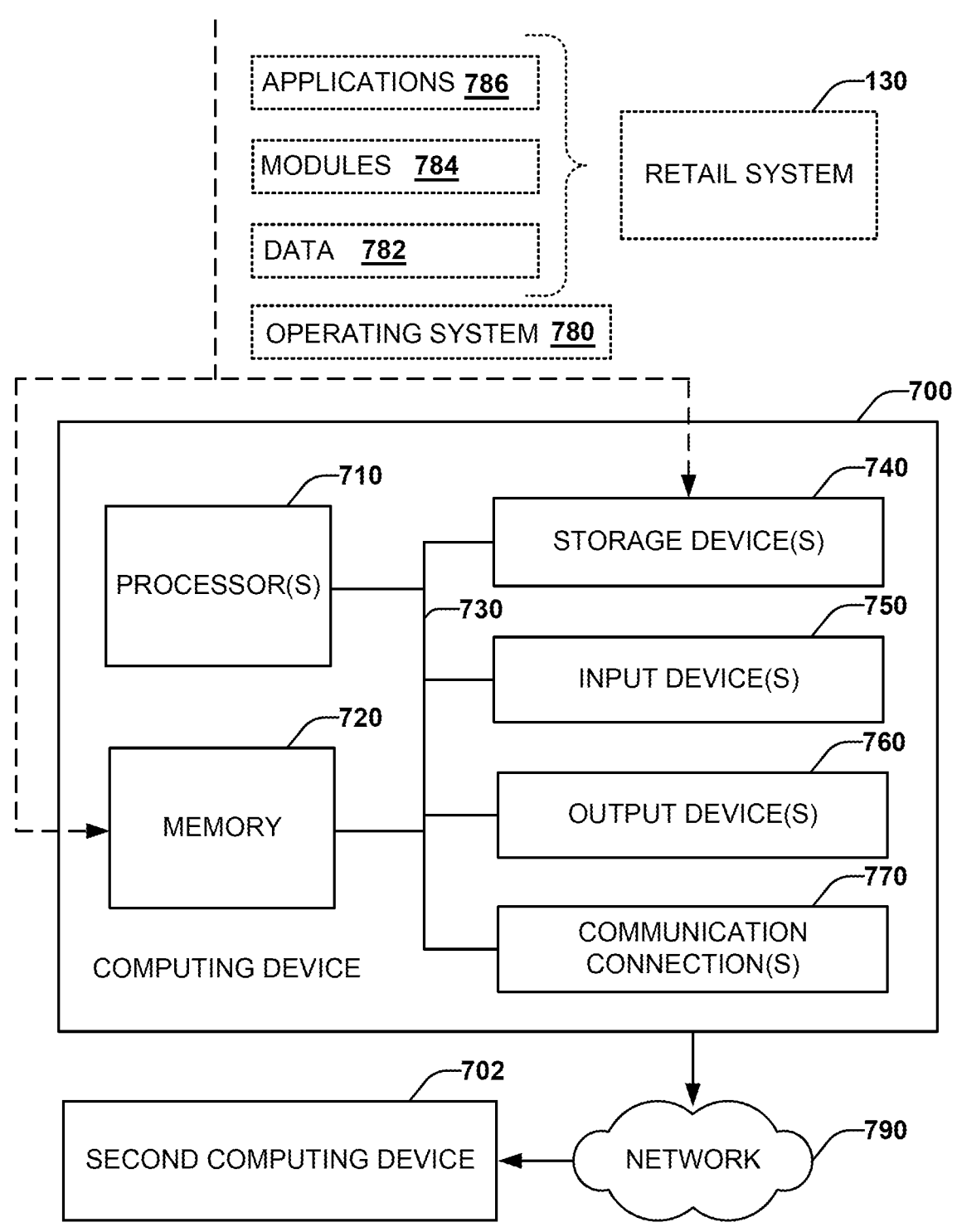
FIG. 7 illustrates a computing environment where one or more of the provisions set forth herein can be implemented, in accordance with one or more embodiments described herein.

To provide a context for the disclosed subject matter, FIG. 7, as well as the following discussion, are intended to provide a brief, general description of a suitable environment in which various aspects of the disclosed subject matter can be implemented. However, the suitable environment is solely an example and is not intended to suggest any limitation on scope of use or functionality.

While the above-disclosed system and methods can be described in the general context of computer-executable instructions of a program that runs on one or more computers, those skilled in the art will recognize that aspects can also be implemented in combination with other program modules or the like. Generally, program modules include routines, programs, components, data structures, among other things, that perform particular tasks and/or implement particular abstract data types. Moreover, those skilled in the art will appreciate that the above systems and methods can be practiced with various computer system configurations, including single-processor, multi-processor or multi-core processor computer systems, mini-computing devices, server computers, as well as personal computers, hand-held computing devices (e.g., personal digital assistant (PDA), smartphone, tablet, watch . . . ), microprocessor-based or programmable consumer or industrial electronics, and the like. Aspects can also be practiced in distributed computing environments where tasks are performed by remote processing devices linked through a communications network. However, some, if not all aspects, of the disclosed subject matter can be practiced on stand-alone computers. In a distributed computing environment, program modules may be located in one or both of local and remote memory devices.

With reference to FIG. 7, illustrated is an example computing device 700 (e.g., desktop, laptop, tablet, watch, server, hand-held, programmable consumer or industrial electronics, set-top box, game system, compute node, . . . ). The computing device 700 includes one or more of processor(s) 710, memory 720, system bus 730, storage device(s) 740, input device(s) 750, output device(s) 760, and communications connection(s) 770. The system bus 730 communicatively couples at least the above system constituents. However, the computing device 700, in its simplest form, can include one or more of processor(s) 710 coupled to memory 720, wherein the one or more of processor(s) 710 execute various computer-executable actions, instructions, and or components stored in the memory 720.

The processor(s) 710 can be implemented with a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. The processor(s) 710 may also be implemented as a combination of computing devices, for example, a combination of a DSP and a microprocessor, a plurality of microprocessors, multi-core processors, one or more microprocessors in conjunction with a DSP core, or any other such configuration. In one configuration, the processor(s) 710 can be a graphics processor unit (GPU) that performs calculations concerning digital image processing and computer graphics.

The computing device 700 can include or otherwise interact with a variety of computer-readable media to facilitate control of the computing device to implement one or more aspects of the disclosed subject matter. The computer-readable media can be any available media accessible to the computing device 700 and includes volatile and non-volatile media, and removable and non-removable media. Computer-readable media can comprise two distinct and mutually exclusive types: storage media and communication media.

Storage media includes volatile and non-volatile, removable and non-removable media implemented in any method or technology for storage of information such as computer-readable instructions, data structures, program modules, or other data. Storage media includes storage devices such as memory devices (e.g., random access memory (RAM), read-only memory (ROM), electrically erasable programmable read-only memory (EEPROM) . . . ), magnetic storage devices (e.g., hard disk, floppy disk, cassettes, tape . . . ), optical disks (e.g., compact disk (CD), digital versatile disk (DVD) . . . ), and solid-state devices (e.g., solid-state drive (SSD), flash memory drive (e.g., card, stick, key drive . . . ) . . . ), or any other like mediums that store, as opposed to transmit or communicate, the desired information accessible by the computing device 700. Accordingly, storage media excludes modulated data signals as well as that which is described with respect to communication media.

Communication media embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared, and other wireless media.

The memory 720 and storage device(s) 740 are examples of computer-readable storage media. Depending on the configuration and type of computing device, the memory 720 may be volatile (e.g., random access memory (RAM)), non-volatile (e.g., read only memory (ROM), flash memory . . . ), or some combination of the two. By way of example, the basic input/output system (BIOS), including basic routines to transfer information between elements within the computing device 700, such as during start-up, can be stored in non-volatile memory, while volatile memory can act as external cache memory to facilitate processing by the processor(s) 710, among other things.

The storage device(s) 740 include removable/non-removable, volatile/non-volatile storage media for storage of vast amounts of data relative to the memory 720. For example, storage device(s) 740 include, but are not limited to, one or more devices such as a magnetic or optical disk drive, floppy disk drive, flash memory, solid-state drive, or memory stick.

Memory 720 and storage device(s) 740 can include, or have stored therein, operating system 780, application(s) 786, one or more of program module 784, and data 782. The operating system 780 acts to control and allocate resources of the computing device 700. Application(s) 786 can include one or both of system and application software and can exploit management of resources by the operating system 780 through program modules 784 and data 782 stored in the memory 720 and/or storage device(s) 740 to perform one or more actions. Accordingly, application(s) 786 can turn a general-purpose computer (e.g., computing device 700) into a specialized machine in accordance with the logic provided thereby.

All or portions of the disclosed subject matter can be implemented using standard programming and/or engineering techniques to produce software, firmware, hardware, or any combination thereof to control the computing device 700 to realize the disclosed functionality. By way of example and not limitation, all or portions of the retail system 130 can be, or form part of, the application(s) 786, and include one or more of program modules 784 and data 782 stored in memory and/or storage device(s) 740 whose functionality can be realized when executed by one or more processor(s) 710.

In accordance with one particular configuration, the processor(s) 710 can correspond to a system on a chip (SOC) or like architecture including, or in other words integrating, both hardware and software on a single integrated circuit substrate. Here, the processor(s) 710 can include one or more processors as well as memory at least similar to the processor(s) 710 and memory 720, among other things. Conventional processors include a minimal amount of hardware and software and rely extensively on external hardware and software. By contrast, a SOC implementation of a processor is more powerful, as it embeds hardware and software therein that enable particular functionality with minimal or no reliance on external hardware and software. For example, the retail system 130 and/or functionality associated therewith can be embedded within hardware in a SOC architecture.

The input device(s) 750 and output device(s) 760 can be communicatively coupled to the computing device 700. By way of example, the input device(s) 750 can include a pointing device (e.g., mouse, trackball, stylus, pen, touchpad, . . . ), keyboard, joystick, microphone, voice user interface system, camera, motion sensor, and a global positioning satellite (GPS) receiver and transmitter, among other things. The output device(s) 760, by way of example, can correspond to a display device (e.g., liquid crystal display (LCD), light emitting diode (LED), plasma, organic light-emitting diode display (OLED) . . . ), speakers, voice user interface system, printer, and vibration motor, among other things. The input device(s) 750 and output device(s) 760 can be connected to the computing device 700 by way of wired connection (e.g., bus), wireless connection (e.g., Wi-Fi, Bluetooth, . . . ), or a combination thereof.

The computing device 700 can also include communication connection(s) 770 to enable communication with at least a second computing device 702 utilizing a network 790. The communication connection(s) 770 can include wired or wireless communication mechanisms to support network communication. The network 790 can correspond to a local area network (LAN) or a wide area network (WAN) such as the Internet. The second computing device 702 can be another processor-based device with which the computing device 700 can interact. In one instance, the computing device 700 can execute a retail system 130 for a first function, and the second computing device 702 can execute a retail system 130 for a second function in a distributed processing environment. Further, the second computing device can provide a network-accessible service that stores source code, and encryption keys, among other things that can be employed by the retail system 130 executing on the computing device 700.

The above-described embodiments of the present disclosure are presented for purposes of illustration and not of limitation, and the present disclosure is limited only by the claims which follow. Furthermore, it should be noted that the features and limitations described in any one embodiment may be applied to any embodiment herein, and flowcharts or examples relating to one embodiment may be combined with any other embodiment in a suitable manner, done in different orders, or done in parallel. In addition, the systems and methods described herein may be performed in real time. It should also be noted that the systems or methods described above may be applied to, or used in accordance with, other systems or methods.

The present techniques will be better understood with reference to the following enumerated embodiments:

A1. A method comprising receiving first transfer data for a first transfer associated with a second category of resources and a first indication whether the first transfer is associated with abusive behavior with respect to an entity involved in the first transfer; processing the first transfer data using a first machine learning model to generate a first prediction regarding whether the first transfer is associated with abusive behavior with respect to an entity involved in the first transfer; in response to determining that the first prediction does not match the first indication, updating the first machine learning model, based on the first transfer data and the first indication, to generate a second machine learning model for the second category of resources to predict whether a transfer is associated with abusive behavior with respect to an entity involved in the transfer; receiving second transfer data for a second transfer associated with a second category of resources; and processing the second transfer data using the second machine learning model to generate a second prediction regarding whether the second transfer is associated with abusive behavior with respect to an entity involved in the second transfer.

A2. The method of any of the preceding embodiments, further comprising: receiving a training dataset comprising (1) transfer data for a plurality of transfers of a first category of resources and (2) corresponding indications regarding whether a transfer is associated with abusive behavior with respect to an entity involved in the transfer; and training, based on the training dataset, the first machine learning model for the first category of resources to predict whether a transfer is associated with abusive behavior with respect to an entity involved in the transfer.

A3. The method of any of the preceding embodiments, further comprising: in response to the second prediction indicating that the second transfer is associated with abusive behavior, transmitting a command to prevent authentication of the second transfer.

A4. The method of any of the preceding embodiments, wherein transmitting the command for preventing authentication of the second transfer comprises disabling virtual authentication data associated with the first transfer.

A5. The method of any of the preceding embodiments, further comprising: in response to receiving an indication of a successful execution of the command, transmitting a notification at a device of the entity indicating prevention of authentication of the second transfer.

A6. The method of any of the preceding embodiments, further comprising receiving, via a user interface, a user input indicating authorization for authentication of the second transfer; and in response to receiving the user input, transmitting a second command for enabling authentication of the second transfer.

A7. The method of any of the preceding embodiments, further comprising updating, based on the user input, the second machine learning model.

A8. The method of any of the preceding embodiments, further comprising: extracting, from the second transfer data, properties of the second transfer, wherein the properties include resource data and virtual authentication data associated with the second transfer data.

A9. The method of any of the preceding embodiments, wherein determining that the first prediction does not match the first indication comprises: determining that an output probability of the first machine learning model exceeds a threshold probability.

A10. One or more tangible, non-transitory, computer-readable media storing instructions that, when executed by a data processing apparatus, cause the data processing apparatus to perform operations comprising those of any of embodiments A1-9.

A11. A system comprising: one or more processors; and memory storing instructions that, when executed by the one or more processors, cause the processors to effectuate operations comprising those of any of embodiments A1-9.

A12. A system comprising means for performing any of embodiments A1-9.

A13. A system comprising cloud-based circuitry for performing any of embodiments A1-9.

B1. A system, comprising: a processor coupled to a memory that includes instructions that, when executed by the processor, cause the processor to identify a reseller of goods or services from a merchant; request reseller data including transaction data, account data, and virtual card data; invoke a machine learning model with the reseller data, wherein the machine learning model is trained to generate a score that captures a likelihood that the reseller is an abusive reseller characterized by a quantity of purchased goods and price of resold goods; compare the score to a predetermined threshold; block reseller purchases from the merchant when the score satisfies the predetermined threshold; and notify the merchant of a potential abusive reseller.

B2. The system of any of the preceding embodiments, wherein the virtual card data includes two or more virtual card numbers associated with the reseller.

B3. The system of any of the preceding embodiments, wherein the two or more virtual card numbers are locked to block purchases.

B4. The system of any of the preceding embodiments, wherein the two or more virtual card numbers are unlocked in response to permission from the merchant.

B5. The system of any of the preceding embodiments, wherein the reseller data further comprises an internet protocol address.

B6. The system of any of the preceding embodiments, wherein the machine learning model is trained to generate a score indicative of an abusive reseller when multiple orders for a maximum quantity of purchased goods originate from a single protocol address.

B7. The system of any of the preceding embodiments, wherein the machine learning model is trained to: infer purchases through multiple channels are associated with the reseller; aggregate the purchases; and generate a score indicative of an abusive reseller when aggregate purchases exceed a predetermined quantity of goods set by the merchant.

B8. The system of any of the preceding embodiments, wherein the instructions further cause the processor to update the machine learning model based on a previous score and merchant input regarding whether the reseller is abusive.

B9. A method, comprising: executing on a processor instructions that cause the processor to perform operations associated with identifying an abusive reseller, the operations comprising: identifying a reseller of goods or services from a merchant; requesting reseller data including transaction data, account data, and virtual card data; invoking a machine learning model with the reseller data, wherein the machine learning model is trained to generate a score that captures a likelihood that the reseller is an abusive reseller characterized by a quantity of purchased goods and price of resold goods; comparing the score to a predetermined threshold; and notifying the merchant of a potential abusive reseller, when the score satisfies the predetermined threshold.

B10. The method of any of the preceding embodiments, wherein the operations further comprise blocking a purchase from the merchant to the reseller when the score satisfies a second predetermined threshold.

B11. The method of any of the preceding embodiments, wherein blocking the purchase comprises activating a lock on a virtual payment card of the reseller.

B12. The method of any of the preceding embodiments, wherein the operations further comprise unlocking the virtual payment card in response to receipt of permission from the merchant.

B13. The method of any of the preceding embodiments, wherein the operations further comprise updating the machine learning model based on input from the merchant regarding identification of the reseller as an abusive reseller.

B14. The method of any of the preceding embodiments, wherein the operations further comprise requesting purchase limit and suggested retail price from the merchant.

B15. The method of any of the preceding embodiments, wherein the operations further comprise training the machine learning model to adjust the score to reflect an increased likelihood of abuse when a purchase limit is exceeded or a resale price is a predetermined amount above the suggested retail price.

B16. The method of any of the preceding embodiments, wherein the operations further comprise training the machine learning model to generate the score based on internet protocol address and multiple purchases from the address.

B17. A computer-implemented method comprising: triggering execution of a machine learning model trained to predict a likelihood that a reseller is a fraudulent reseller characterized by violation of a purchase limit and resale greater than a threshold more than a suggested retail price; receiving a notification including identification of a potentially fraudulent reseller from the machine learning model; and updating a point-of-sale system to block purchases by the reseller based on the notification.

B18. The computer-implemented method of any of the preceding embodiments, further comprising: generating a notification including potential consequences of being deemed a fraudulent reseller; and conveying the notification to the reseller.

B19. The computer-implemented method of any of the preceding embodiments, further comprising: generating a message regarding resale policies in response to receiving notification of a potentially fraudulent reseller; and updating the point of sale system to present the message to during checkout.

B20. The computer-implemented method of any of the preceding embodiments, further comprising updating the point of sale system to permit the purchases by the reseller.

What is claimed is:

1. A system for detecting malicious network activity in resource transfers, the system comprising:
   one or more processors; and
   one or more non-transitory, computer-readable media comprising instructions that, when executed by the one or more processors, causes operations comprising:
      receiving a training dataset comprising (1) transfer data for a plurality of transfers of a first category of resources and (2) corresponding indications regarding whether a transfer is associated with malicious network activity with respect to an entity involved in the transfer;
      training, based on the training dataset, a first machine learning model for the first category of resources to predict whether a transfer is associated with malicious network activity with respect to an entity involved in the transfer;
      receiving first transfer data for a first transfer associated with a second category of resources and a first indication whether the first transfer is associated with malicious network activity with respect to an entity involved in the first transfer;
      processing the first transfer data using the first machine learning model to generate a first prediction regarding whether the first transfer is associated with malicious network activity with respect to an entity involved in the first transfer;
      updating the first machine learning model, based on the first prediction and the first indication, to generate a second machine learning model, using the first transfer data and the first indication, for the second category of resources to predict whether a transfer is associated with malicious network activity with respect to an entity involved in the transfer;
      receiving second transfer data for a second transfer associated with the second category of resources;
      executing the second machine learning model based on the second transfer data to generate a second prediction regarding whether the second transfer is associated with malicious network activity with respect to an entity involved in the second transfer; and
      in response to the second prediction indicating that the second transfer is associated with malicious network activity, preventing authentication of the second transfer by disabling virtual authentication data associated with the first transfer.

2. The system of claim 1, wherein the instructions cause the one or more processors to perform operations comprising:

receiving, via a user interface, a user input indicating authorization for authentication of the second transfer; and in response to receiving the user input, transmitting a second command for enabling authentication of the second transfer.

3. A method for detecting malicious activity in resource transfers, the method comprising:

receiving first transfer data for a first transfer associated with a second category of resources and a first indication whether the first transfer is associated with malicious network activity with respect to an entity involved in the first transfer;

processing the first transfer data using a first machine learning model for a first category of resources to generate a first prediction regarding whether the first transfer is associated with malicious network activity with respect to an entity involved in the first transfer;

updating the first machine learning model, based on the first prediction and the first indication, to generate a second machine learning model for the second category of resources to predict whether a transfer is associated with malicious network activity with respect to an entity involved in the transfer;

receiving second transfer data for a second transfer associated with the second category of resources; and executing the second transfer data using the second machine learning model based on the second transfer data to generate a second prediction regarding whether the second transfer is associated with malicious network activity with respect to an entity involved in the second transfer.

4. The method of claim 3, further comprising:

receiving a training dataset comprising (1) transfer data for a plurality of transfers of the first category of resources and (2) corresponding indications regarding whether a transfer is associated with malicious network activity with respect to an entity involved in the transfer; and training, based on the training dataset, the first machine learning model for the first category of resources to predict whether a transfer is associated with malicious network activity with respect to an entity involved in the transfer.

5. The method of claim 3, further comprising:

in response to the second prediction indicating that the second transfer is associated with malicious network activity, transmitting a command to prevent authentication of the second transfer.

6. The method of claim 5, wherein transmitting the command for preventing authentication of the second transfer comprises disabling virtual authentication data associated with the first transfer.

7. The method of claim 5, further comprising:

in response to receiving an indication of a successful execution of the command, transmitting a notification at a device of the entity indicating prevention of authentication of the second transfer.

8. The method of claim 7, further comprising:

receiving, via a user interface, a user input indicating authorization for authentication of the second transfer; and in response to receiving the user input, transmitting a second command for enabling authentication of the second transfer.

9. The method of claim 8, further comprising updating, based on the user input, the second machine learning model.

10. The method of claim 3, further comprising extracting, from the second transfer data, properties of the second transfer, wherein the properties include resource data and virtual authentication data associated with the second transfer data.

11. The method of claim 3, wherein determining that the first prediction does not match the first indication comprises determining that an output probability of the first machine learning model exceeds a threshold probability.

12. One or more non-transitory, computer-readable media comprising instructions that, when executed by one or more processors, causes operations comprising:

receiving first transfer data for a first transfer associated with a second category of resources and a first indication whether the first transfer is associated with malicious network activity with respect to an entity involved in the first transfer;

processing the first transfer data using a first machine learning model to generate a first prediction regarding whether the first transfer is associated with malicious network activity with respect to an entity involved in the first transfer;

in response to determining that the first prediction does not match the first indication, updating the first machine learning model, based on the first prediction and the first indication, to generate a second machine learning model, using the first transfer data and the first indication, for the second category of resources to predict whether a transfer is associated with malicious network activity with respect to an entity involved in the transfer;

receiving second transfer data for a second transfer associated with the second category of resources; and executing the second transfer data using the second machine learning model based on the second transfer data to generate a second prediction regarding whether the second transfer is associated with malicious network activity with respect to an entity involved in the second transfer.

13. The one or more non-transitory, computer-readable media of claim 12, wherein the instructions cause the one or more processors to perform operations comprising:

receiving a training dataset comprising (1) transfer data for a plurality of transfers of a first category of resources and (2) corresponding indications regarding whether a transfer is associated with malicious network activity with respect to an entity involved in the transfer; and training, based on the training dataset, the first machine learning model for the first category of resources to predict whether a transfer is associated with malicious network activity with respect to an entity involved in the transfer.

14. The one or more non-transitory, computer-readable media of claim 13, wherein the instructions cause the one or more processors to perform operations comprising:

in response to the second prediction indicating that the second transfer is associated with malicious network activity, transmitting a command to prevent authentication of the second transfer.

15. The one or more non-transitory, computer-readable media of claim 14, wherein transmitting the command for preventing authentication of the second transfer comprises disabling virtual authentication data associated with the first transfer.

16. The one or more non-transitory, computer-readable media of claim 14, wherein the instructions cause the one or more processors to perform operations comprising:

in response to receiving an indication of a successful execution of the command, transmitting a notification at a device of the entity indicating prevention of authentication of the second transfer.

17. The one or more non-transitory, computer-readable media of claim 16, wherein the instructions cause the one or more processors to perform operations comprising:

receiving, via a user interface, a user input indicating authorization for authentication of the second transfer; and in response to receiving the user input, transmitting a second command for enabling authentication of the second transfer.

18. The one or more non-transitory, computer-readable media of claim 17, wherein the instructions cause the one or more processors to perform operations comprising updating, based on the user input, the second machine learning model.

19. The one or more non-transitory, computer-readable media of claim 12, the instructions cause the one or more processors to perform operations comprising:

extracting, from the second transfer data, properties of the second transfer, wherein the properties include resource data and virtual authentication data associated with the second transfer data.

20. The one or more non-transitory, computer-readable media of claim 12, wherein determining that the first prediction does not match the first indication comprises:

determining that an output probability of the first machine learning model exceeds a threshold probability.

* * * * *